United States Patent [19]

Orlando et al.

[11] Patent Number: 5,523,579
[45] Date of Patent: Jun. 4, 1996

[54] INFRARED LINE SOURCE PROJECTOR

[75] Inventors: Harold J. Orlando, Costa Mesa; Dean L. Weideman, Lomita; Lawrence M. Scherr, Altadena, all of Calif.

[73] Assignee: Northrop Grumman Corporation, Los Angeles, Calif.

[21] Appl. No.: 229,963

[22] Filed: Apr. 19, 1994

[51] Int. Cl.⁶ ........................................... G01J 1/00
[52] U.S. Cl. ................... 250/504 R; 250/493.1
[58] Field of Search ................ 250/493.1, 494.1, 250/495.1, 504 R

[56] References Cited

U.S. PATENT DOCUMENTS

| | | |
|---|---|---|
| 4,173,777 | 11/1979 | Schmit et al. . |
| 4,575,786 | 3/1986 | Roberts .................. 250/504 R |
| 4,639,603 | 1/1987 | Pistor . |
| 4,647,783 | 3/1987 | Verona .................... 250/495.1 |
| 4,677,294 | 6/1987 | Spector et al. . |
| 4,709,141 | 11/1987 | Olsen . |
| 4,755,674 | 7/1988 | Schaaf . |
| 4,873,657 | 10/1989 | Kornfeld .................. 364/578 |
| 4,876,453 | 10/1989 | Wirick . |
| 5,033,015 | 7/1991 | Zwirn . |
| 5,041,735 | 8/1991 | Chang et al. ............... 250/494.1 |
| 5,144,149 | 9/1992 | Frosch . |

Primary Examiner—Bruce C. Anderson
Attorney, Agent, or Firm—Terry J. Anderson; Karl J. Hoch, Jr.

[57] ABSTRACT

This is a target projector projecting a vertical line source of infrared energy for testing of thermal imaging sensors. A vertical wire of a material which heats and emits infrared energy when an electrical current is passed therethrough is heated by a DC source. There is a projector for intercepting a portion of infrared energy from the wire, for passing only a line source beam portion which comprises a narrow beam of about 10 milliradians width and subtends a vertical angle of about 40°, and for directing the narrow beam on an optical center line of a thermal imaging sensor being tested. One type of projector comprises a narrow vertical mirror oriented about a longitudinal axis of rotation which is in a common plane with the wire disposed between 4" and 10" from the wire and rotatable about the axis of rotation to project the line source beam in a desired direction. In another projector, the mirror is replaced by a slit. The wire and projector in combination are also rotatable to a position 45° from vertical so that dead channels of a sensor tied to adjacent live channels can be identified.

17 Claims, 3 Drawing Sheets

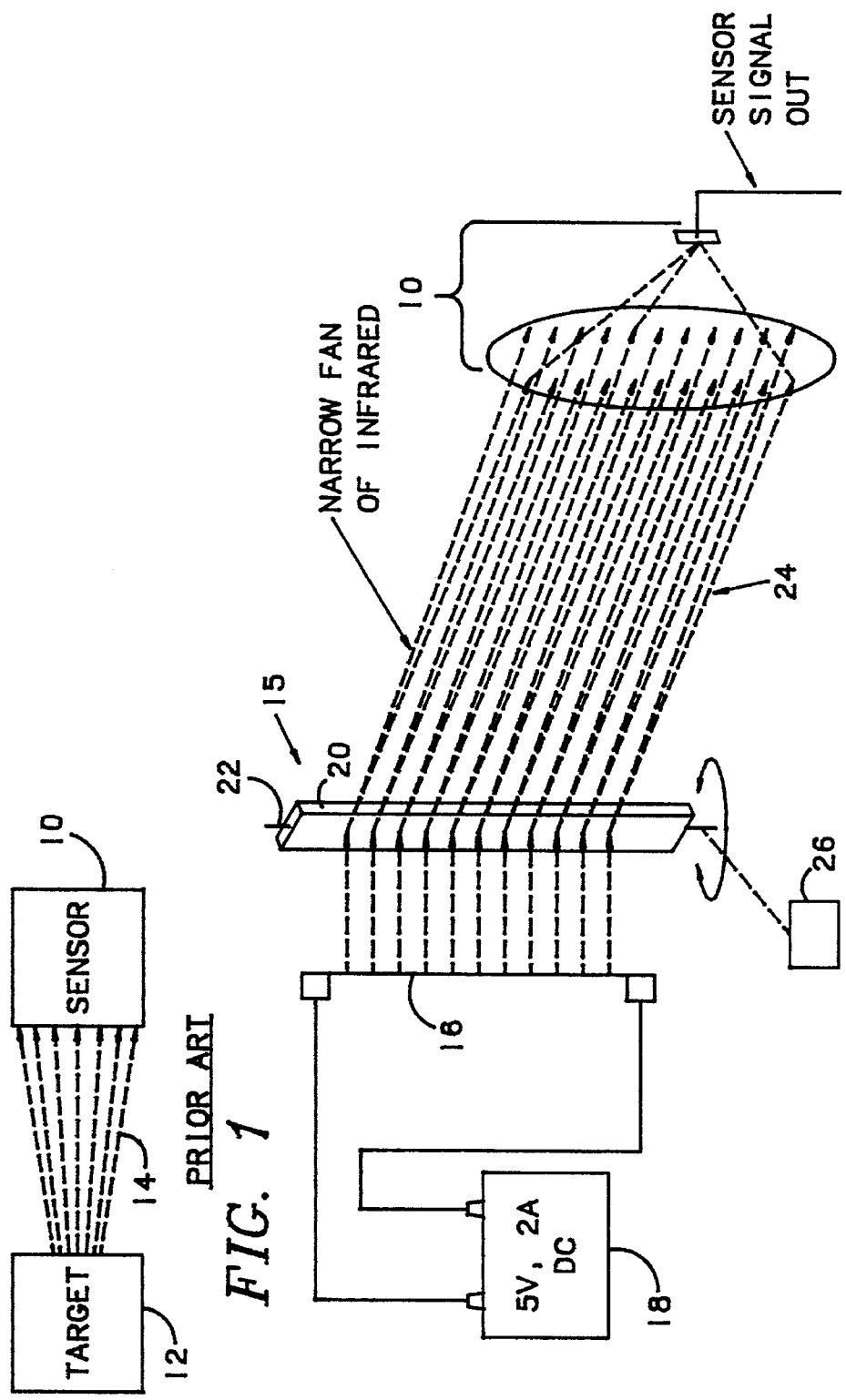

INFRARED LINE SOURCE PROJECTOR

BACKGROUND OF THE INVENTION

TECHNICAL FIELD

This invention relates to sources of energy for testing sensors of the energy and, more particularly, to a system for testing thermal imaging sensors comprising means for holding a thermal imaging sensor to be tested and a target projector projecting a vertical line source of infrared energy on an optical center line of said thermal imaging sensor.

BACKGROUND ART

As depicted in FIG. 1, it is well known in the art that to test an infrared sensor 10, one can use a target 12 emitting a pattern of infrared energy 14. Relevant prior art U.S. patents known to the inventors herein include:

1. U.S. Pat. No. 4,876,453—METHOD AND APPARATUS FOR CALIBRATING AN IMAGING SENSOR. This application is relevant to the present invention because it describes a method of calibrating an infrared imaging sensor. It proposes a two step process. During step 1, data from the sensor's detectors are obtained from an image position "A". In step 2, data from the sensor's detectors are obtained from an image position "B". Detector output calibration factors are then computed from the responses generated in steps 1 and 2. What is missing is any mention of a target providing the specialized features of the present invention.

2. U.S. Pat. No. 4,173,777—JET AIRCRAFT AND/OR MISSILE PLUME SIMULATOR. This application is relevant to the present invention because it relates to simulation of the intensity and spectral content of jet aircraft and missile plumes by use of a xenon lamp and optical filters. Thus, it could be a target for testing certain sensors. What is missing is any mention of a target providing the specialized features of the present invention. In particular, it contains no reference to projection of a vertically long, horizontally thin, source of illumination for use in testing imaging sensors.

3. U.S. Pat. No. 4,639,603—IR IMAGE SOURCE USING SPECULARY REFLECTIVE TRANSPARENCY. This application is relevant to the present invention because it discloses the suitability of the film material "Polpan CT" in image simulation applications for infrared imaging devices. It describes the use of film transparency to create images of targets in general. What is missing is any mention of a target providing the specialized features of the present invention. In particular, it contains no reference to any form of a "line source target".

4. U.S. Pat. No. 4,755,674—INFRARED DETECTOR—This application is relevant to the present invention because it describes an infrared detector capable of continuously monitoring itself and of generating an alarm signal when appropriate. What is missing is any mention of a target source suitable for use in testing infrared sensors as an object of the invention.

5. U.S. Pat. No. 4,677,294—SELF-CALIBRATING RADIATION SENSORS AND CONTROL FOR RADIATION SENSORS. This application is relevant to the present invention because it describes a self-calibrating radiation detection apparatus suitable for fire and explosion suppression applications. It utilizes detectors operating in the IR and UV wavebands and a scheme for using their outputs to maintain calibration. What is missing is any mention of a target source suitable for use in testing infrared sensors as an object of the invention. No mention is made of a "line source target" for maintaining calibration or for any other purpose.

6. U.S. Pat. No. 4,709,141—NON-DESTRUCTIVE TESTING OF COOLED DETECTOR ARRAYS. This application is relevant to the present invention because it describes an apparatus and method for electrically and radiometrically testing an array of infrared detectors prior to fusion of the array with a silicon integrated circuit. It involves the use of optical switches to the detector array to be tested. What is missing is any mention of a target source suitable for use in testing infrared sensors as an object of the invention. No mention is made of a "line source target" suitable for use in testing infrared sensors.

7. U.S. Pat. No. 5,033,015—AUTOMATED SYSTEM FOR TESTING AN IMAGING SENSOR. This application is relevant to the present invention because it describes a method for automating the test of imaging systems. What is missing is any mention of a "line source target" for use in testing of imaging sensors or any other purpose.

8. U.S. Pat. No. 5,144,149—ELECTRICAL SIGNAL TO THERMAL IMAGE CONVERTER. This application is relevant to the present invention because it describes a target which is irradiated by a source of energy such as a laser beam. The resultant heating of the target substrate is viewed by the sensor under test. What is missing is any mention of a "line source target" in any form.

What is needed and presently unavailable in the prior art is a method of projecting a vertical thermal line source extending a large vertical angle to help locate dead channels during automated testing of thermal imaging sensors. The method should also serve to determine uniformity of response (channel-to-channel) in active channels when testing thermal imaging sensors using a low-cost compact optical test console.

Wherefore, it is an object of this invention to provide a vertical thermal line source target for testing thermal imaging sensors.

It is another object of this invention to provide a vertical thermal line source target for testing thermal imaging sensors which helps to locate dead channels during automated testing while also serving to determine uniformity of response (channel-to-channel) in active channels.

It is still another object of this invention to provide a vertical thermal line source target for testing thermal imaging sensors over fields of view ranging from 1° to 40°.

It is yet another object of this invention to provide a vertical thermal line source target for testing thermal imaging sensors over a variety of aperture sizes, fields of view, and spatial resolutions.

Other objects and benefits of this invention will become apparent from the description which follows hereinafter when read in conjunction with the drawing figures which accompany it.

SUMMARY OF THE DISCLOSURE

The foregoing objects have been achieved by the target projector of the present invention for projecting a vertical line source of infrared energy for testing of thermal imaging sensors comprising, a vertical wire of a material which heats and emits infrared energy when an electrical current is passed therethrough; power means for passing a DC electrical current through the wire sufficient to heat the wire to a point where it emits infrared energy; and, projector means for intercepting a portion of infrared energy from the wire, for passing only a line source beam portion which comprises a narrow beam of about 10 milliradians width and subtends a vertical angle of about 40°, and for directing the narrow beam on an optical center line of a thermal imaging sensor being tested.

In one embodiment, the projector means comprises a narrow vertical mirror oriented about a longitudinal axis of rotation which is in a common plane with the wire disposed between 4" and 10" from the wire and rotatable about the axis of rotation to project the line source beam in a desired direction. Preferably, the mirror is flat and between 0.050" and 0.100" wide.

In another embodiment, the projector means comprises a narrow vertical slit oriented about a longitudinal axis which is in a common plane with the wire disposed between 4" and 10" from the wire. Preferably, the slit is between 0.050" and 0.100" wide.

In another aspect of the present invention, the wire and the projector means in combination are rotatable to a position 45° from vertical so that dead channels of a thermal imaging sensor under test tied to adjacent live channels can be identified.

BRIEF DESCRIPTION OF THE DRAWINGS

FIG. 1 is a simplified block diagram of the prior art environment of the present invention.

FIG. 2 is a simplified drawing showing the present invention in an embodiment employing a mirror to create and adjustable width line source of infrared radiation oriented to test the vertical field of view of a sensor under test.

DETAILED DESCRIPTION OF THE PREFERRED EMBODIMENT

Figure 3:
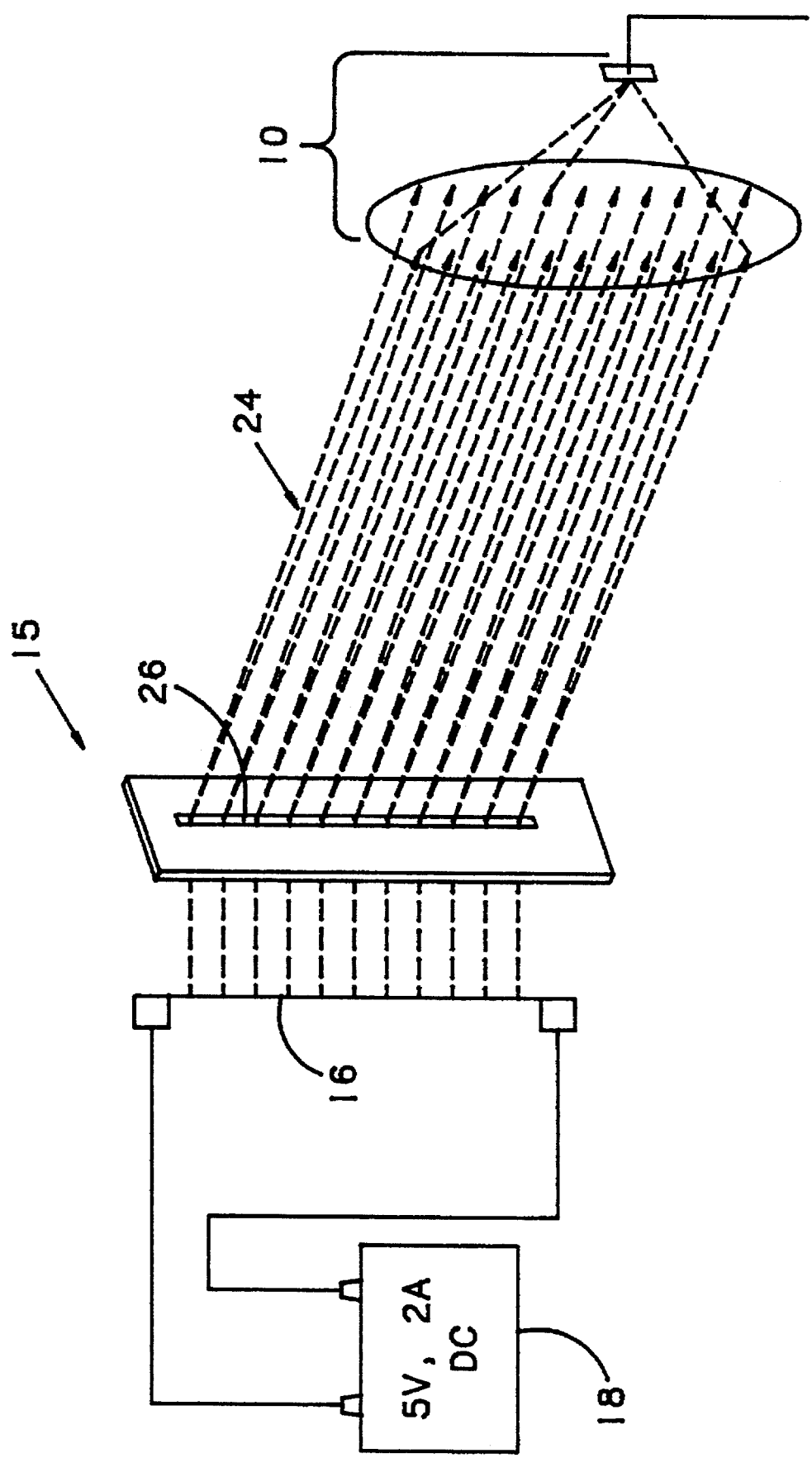
FIG. 3 is a simplified drawing showing the present invention in an embodiment employing a slit to create a non-adjustable width line source of infrared radiation oriented to test the vertical field of view of a sensor under test.

The present invention is shown in a first embodiment in FIG. 2. The line source projector 15 consists of a thin wire 16 (0.010–0.020" diameter) of nichrome or similar material that is heated by running a current through it from a DC source such as the battery 18. A narrow vertical mirror 20 oriented about a longitudinal axis of rotation 22 which is in a common plane with the wire 16 is placed several inches (4–10") from the wire 16 and rotated about its axis 22 to project the line source beam 24 in the desired direction. The mirror 20 does not need to be curved as in conventional projection systems and is flat. The width of the line source beam 24 is controlled primarily by the mirror width, which is 0.050–0.100" wide. This results in a projected line source beam 24 having a width of about 10 milliradians, which is suitable for sensors with fields of view of 1°–40°. Alignment of the projector 15 is on the optical center line of the sensor 10 and is not critical. In most cases, an angular alignment of several milliradians and a positional alignment within 0.1" is sufficient.

As depicted in FIG. 2, by employing a powered driving device 26 of some kind connected to rotate the mirror 20 about its axis 22, the alignment of the beam 24 can be adjusted by automated testing apparatus used to test the sensor 10.

Figure 4:
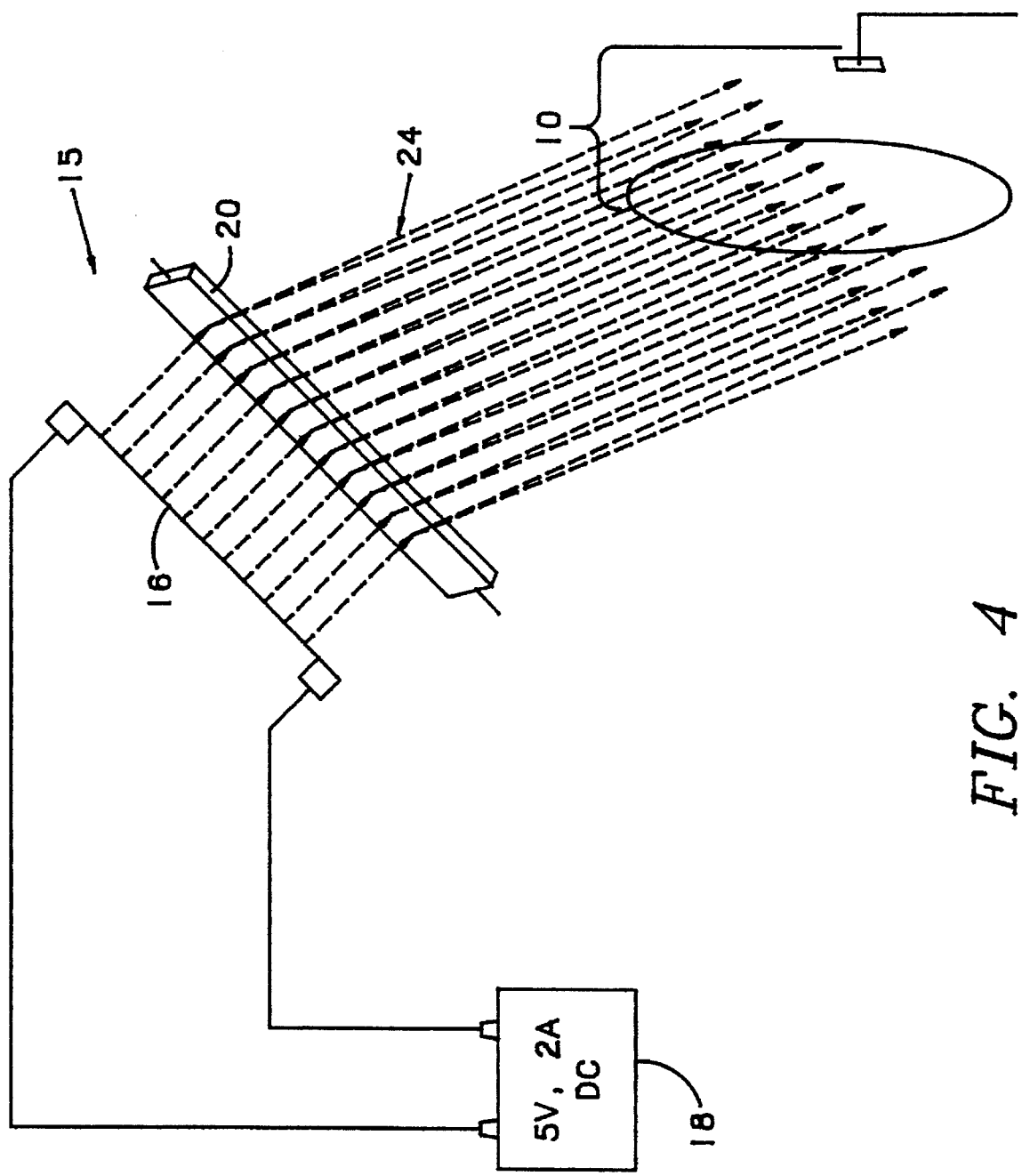
FIG. 4 is a simplified drawing showing the present invention rotated 45° from vertical so that dead channels tied to adjacent dead channels in the sensor can be identified.

The above-described construction provides a fan of illumination which is narrow in the horizontal direction so that a sharp spike signal is scanned by the sensor 10 and wide enough in the vertical direction so that all the sensor channels are simultaneously covered top to bottom. A further feature is that it can be rotated 45° from the vertical as depicted in FIG. 4 so that strapped channels (i.e. dead channels tied to an adjacent live channel) can be identified by employing testing techniques well known to those of ordinary skill in the art.

An alternate embodiment of the present invention is shown in FIG. 3. In this case, the mirror 20 of the prior embodiment is replaced by a narrow vertical slit 28. As with the mirror 20, the width of the slit 28 determines the width of the beam 24.

Wherefore, having thus described the present invention, what is claimed is:

1. A target projector projecting a vertical line source of infrared energy for testing of thermal imaging sensors comprising:

a) a vertical wire of a material which heats and emits infrared energy when an electrical current is passed therethrough;

b) power means for passing electrical power through said wire sufficient to heat said wire to a point where it emits infrared energy; and, c) projector means for intercepting a portion of infrared energy from said wire, for passing only a line source beam portion which comprises a narrow beam of about 10 milliradians width and subtends a vertical angle of about 40°, and for directing said narrow beam on an optical center line of a thermal imaging sensor being tested.

2. The target projector of claim 1 wherein said projector means comprises:

a narrow vertical mirror oriented about a longitudinal axis of rotation which is in a common plane with said wire disposed between 4" and 10" from said wire and rotatable about said axis of rotation to project said line source beam in a desired direction.

3. The target projector of claim 2 wherein:

said mirror is flat and between 0.050" and 0.100" wide.

4. The target projector of claim 1 wherein said projector means comprises:

a narrow vertical slit oriented about a longitudinal axis which is in a common plane with said wire disposed between 4" and 10" from said wire.

5. The target projector of claim 4 wherein:

said slit is between 0.050" and 0.100" wide.

6. The target projector of claim 1 wherein:

said wire and said projector means in combination are rotatable to a position 45° from vertical so that dead channels of a thermal imaging sensor under test tied to adjacent live channels can be identified.

7. A method of projecting a vertical line source of infrared energy for testing of thermal imaging sensors comprising the steps of:

a) disposing a wire of a material which heats and emits infrared energy when an electrical current is passed therethrough in a vertical orientation;

b) passing electrical power through the wire sufficient to heat the wire to a point where it emits infrared energy;

c) intercepting a portion of infrared energy from the wire;

d) passing only a line source beam portion which comprises a narrow beam of about 10 milliradians width and subtends a vertical angle of about 40°; and, e) directing the narrow beam on an optical center line of a thermal imaging sensor being tested.

8. The method of claim 7 wherein said steps (c) and (d) comprise the steps of:

a) disposing a narrow vertical mirror oriented about a longitudinal axis of rotation which is in a common plane with the wire between 4" and 10" from the wire;

b) intercepting and reflecting a portion of infrared energy from the wire as the line source beam; and, c) rotating the mirror about the axis of rotation to project the line source beam in a desired direction.

9. The method of claim 7 wherein said steps (c) and (d) comprise the steps of:

a) disposing a narrow vertical slit oriented about a longitudinal axis of rotation which is in a common plane with the wire between 4" and 10" from the wire; and, b) passing a portion of infrared energy from the wire through the slit as the line source beam and intercepting the rest.

10. The method of claim 7 and additionally comprising the steps of:

a) rotating the line source beam to a position 45° from vertical; and, b) using the line source beam to identify dead channels of a thermal imaging sensor under test tied to adjacent live channels.

11. A system for testing thermal imaging sensors comprising:

a) means for holding a thermal imaging sensor to be tested; and, b) a target projector projecting a vertical line source of infrared energy on an optical center line of said thermal imaging sensor, said target projector comprising, b1) a vertical wire of a material which heats and emits infrared energy when an electrical current is passed therethrough;

b2) power means for passing electrical power through said wire sufficient to heat said wire to a point where it emits infrared energy; and, b3) projector means for intercepting a portion of infrared energy from said wire, for passing only a line source beam portion which comprises a narrow beam of about 10 milliradians width and subtends a vertical angle of about 40°, and for directing said narrow beam on an optical center line of a thermal imaging sensor being tested.

12. The system of claim 11 wherein said projector means comprises:

a narrow vertical mirror oriented about a longitudinal axis of rotation which is in a common plane with said wire disposed between 4" and 10" from said wire and rotatable about said axis of rotation to project said line source beam in a desired direction.

13. The system of claim 12 and additionally comprising:

means for rotating said narrow vertical mirror about said longitudinal axis of rotation to project said line source beam in a desired direction.

14. The system of claim 12 wherein:

said mirror is flat and between 0.050" and 0.100" wide.

15. The system of claim 11 wherein said projector means comprises:

a narrow vertical slit oriented about a longitudinal axis which is in a common plane with said wire disposed between 4" and 10" from said wire.

16. The system of claim 15 wherein:

said slit is between 0.050" and 0.100" wide.

17. The system of claim 11 wherein:

said wire and said projector means in combination are rotatable to a position 45° from vertical so that dead channels of said thermal imaging sensor tied to adjacent live channels can be identified.

* * * * *